Patented Nov. 16, 1943

2,334,488

UNITED STATES PATENT OFFICE 2,334,488

MANUFACTURE OF AROMATIC HYDROXY COMPOUNDS

John M. Harris, Jr., Springfield Township, Montgomery County, Pa., and Norman W. Wroby, Tenafly, and William B. Brown, Westmont, N. J., assignors, by mesne assignments, to Allied Chemical & Dye Corporation, a corporation of New York No Drawing. Application June 18, 1941,
Serial No. 398,546

4 Claims. (Cl. 260—628)

This invention relates to improvements in the manufacture of aromatic hydroxy compounds, more particularly to improvements in those steps of the manufacture of synthetic phenol which involve separating sodium phenolate from sodium sulfite and recovering phenol from the sodium phenolate thus obtained.

As is well known, many aromatic hydroxy compounds may be readily manufactured by sulfonating the corresponding hydrocarbon, converting the sulfonic acid to an alkali metal salt, fusing the salt with the hydroxide of the alkali metal to produce a mass containing the sulfite of the alkali metal and the alkali salt of the aromatic hydroxy compound, separating the latter salt from the sulfite, and recovering the desired aromatic hydroxy compound therefrom. Thus phenol may be manufactured by sulfonating benzene, converting the benzene sulfonic acid thus obtained to the sodium salt, fusing the sodium benzene sulfonate with sodium hydroxide to produce a mass containing sodium phenolate and sodium sulfite, separating the phenolate from the sodium sulfite, and liberating phenol from the phenolate thus obtained. The separation of sodium phenolate from the sodium sulfite should be as complete as possible in order that high yields of phenol may be obtained from this process. Because of the fact that sodium phenolate is more soluble in water than sodium sulfite, the separation thereof from the sulfite has generally been carried out by treating the fusion mass with sufficient water to dissolve only the sodium phenolate, the bulk of the sodium sulfite remaining undissolved under such conditions. This method of separation, however, has several disadvantages. In the first place, the solubility of sodium sulfite in the sodium phenolate solution formed is considerable, so that the solution obtained always contains substantial quantities of sodium sulfite which must be subsequently recovered to permit economical practice of the process. In the second place, the sodium sulfite remaining undissolved usually retains therewith appreciable quantities of the sodium phenolate, which represents a loss of product since it is generally uneconomical to wash the sulfite sufficiently well to recover all the sodium phenolate contained therein. In the third place, the sodium sulfite tends to set into a hard mass upon standing, thus rendering recovery of the sodium phenolate therefrom even more difficult. As a result, the above method of separating these compounds is nowhere near as satisfactory as might be desired.

After the sodium phenolate has been separated from sodium sulfite as above described, the phenol has generally been recovered therefrom by acidifying the phenolate solution with an acid or with an acidic gas such as carbon dioxide, whereby the phenolate reacts to form phenol and the sodium salt of the acid employed. The phenol, being substantially insoluble in the aqueous solution, separates therefrom and may be recovered by decantation. It has been the practice to recover the alkali salt formed upon liberation of the phenol by evaporating the aqueous solution from which the phenol is separated; however, this evaporation step inevitably entails considerable expense because of the necessity of operating and maintaining large and cumbersome evaporating units. Furthermore, small amounts of phenol dissolve in the aqueous solution and are not recovered therefrom upon evaporation; while these losses of phenol are small for each batch of sodium phenolate treated, the cumulative losses of phenol upon continued operation of the process in this manner become significant.

From the above discussion it will be evident that the present methods used for separating sodium phenolate from sodium sulfite and recovering phenol therefrom possess several important disadvantages. Furthermore, similar processes for the manufacture of other aromatic hydroxy compounds such as cresol, resorcinol, naphthols, etc., possess the same or similar disadvantages. Although many attempts have been made to overcome these disadvantages and thereby render these processes more economical, they have not been particularly successful.

It is an object of this invention to provide improvements in the above described processes for the manufacture of aromatic hydroxy compounds.

It is a more specific object of this invention to provide an improved method for separating sodium phenolate from sodium sulfite and recovering phenol from the sodium phenolate thus obtained.

We have found that the above disadvantages may be largely obviated and important economies in the manufacture of aromatic hydroxy compounds may be effected by contacting the mixture of the alkali metal sulfite and the alkali salt of the aromatic hydroxy compound, obtained in the fusion step, with a substantially saturated solution of the sulfite, separating the aqueous solution thus formed, containing dissolved therein the salt of the aromatic hydroxy compound, from the undissolved sulfite, treating this solution with a gas comprising chiefly sulfur dioxide to liberate the aromatic hydroxy compound from its salt, separating the aromatic hydroxy compound thus obtained and re-using the sulfite solution thus produced for separating additional quantities of the salt of the aromatic hydroxy compound. The preferred embodiment of our invention relates to the manufacture of phenol as hereinabove described and may be carried out by contacting the mixture of sodium phenolate and sodium sulfite, obtained by fusing sodium benzene sulfonate with sodium hydroxide, with a substantially saturated solution of sodium sulfite, separating the aqueous solution thus formed, containing dissolved therein substantially all the sodium phenolate, from the undissolved sodium sulfite, treating this solution with sulfur dioxide to cause the phenol to be liberated from the phenolate, separating the phenol thus obtained, and re-using the solution of sodium sulfite thus produced for the recovery of additional quantities of sodium phenolate. The entire operation, including the separation and liberation steps, is preferably carried out at a temperature above that at which the alkali metal sulfite becomes hydrated in order to facilitate separation of the salt of the hydroxy compound from the sulfite; thus when operating in accordance with the preferred embodiment of our invention, i. e., when sodium sulfite is the alkali metal sulfite present in the fusion mass, temperatures above about 35° C. are preferably used.

It will be noted that the preferred embodiment of our invention involves the unusual step of employing a saturated solution of sodium sulfite to effect the separation of sodium sulfite from sodium phenolate produced in the fusion step. We have found that by operating in accordance with our invention the sodium phenolate may be separated practically completely from the sodium sulfite produced therewith, the residual sodium sulfite remaining after the separation containing only very small amounts of the phenolate. The sodium phenolate remaining in the sodium sulfite residue may be readily washed therefrom and a comparatively pure sodium sulfite product thus recovered. Liberation of phenol from the sodium phenolate by acidification of the phenolate with sulfur dioxide yields a substantially saturated solution of sodium sulfite which may be re-used as many times as desired for the separation of additional quantities of sodium phenolate from sodium sulfite. Thus, in effect, our invention involves the use of a sulfite solution produced in the phenol liberation step as the medium for effecting separation of the sodium sulfite from the sodium phenolate produced in the fusion step. Hence, our process eliminates the expensive evaporation step incidental to previous methods for recovering the salts present in the aqueous solutions after liberation of phenol. Furthermore, while the sulfite solution produced in the liberation step is saturated with phenol, this phenol value is not lost, since all or a greater portion of the phenol is, when re-used in accordance with our invention, converted to sodium phenolate upon being contacted with another batch of fusion mass, which generally contains, in addition to sodium phenolate and sodium sulfite, excess sodium hydroxide, and thus passes into the sodium phenolate solution and is re-liberated upon contact with the sulfur dioxide; furthermore, even if the fusion mass does not contain excess sodium hydroxide, no further amounts of phenol could be taken up in the solution upon its re-use in subsequent liberation steps. In effect, therefore, after the saturated sodium sulfite solution initially used becomes saturated with phenol in the first liberation step, no further amounts of phenol product are lost upon re-use of this solution in subsequent liberation steps.

In practicing the preferred embodiment of our invention, the fusion mass produced by the fusion of sodium benzene sulfonate with sodium hydroxide, and containing sodium phenolate, sodium sulfite, generally a small amount of excess sodium hydroxide from the fusion operation, and in some cases relatively small amounts of sodium sulfate, may be mixed in either molten or solid condition with a substantially saturated solution of sodium sulfite and thoroughly agitated therewith. The amount of sulfite solution employed may vary somewhat, but preferably at least about 1½ parts by weight of the solution per part of fusion mass to be treated are used; the amount of sodium sulfite solution may be considerably greater than this value, however, although it is usually preferable to employ as small an amount as possible in order to avoid the handling of large volumes of material. The temperature at which this operation is carried out should preferably be above the transition temperature of anhydrous sodium sulfite to the heptahydrate, i. e., above about 35° C.; it is generally most advantageous to carry out the separation at a temperature slightly below the boiling point of the solution, e. g., 80° to 90° C., because of the fact that the solubility of sodium phenolate in water increases with increasing temperature, whereas the solubility of sodium sulfite decreases slightly. The time required to completely dissolve the sodium phenolate in the solution may vary, but ordinarily agitation for about one-half hour is sufficient.

After the fusion mass has been agitated with the sodium sulfite solution for a suitable time, the sodium sulfite is filtered or centrifuged therefrom, care being taken to maintain the temperature of the filtrate above about 35° C. In order to avoid liberation of phenol from the phenolate being separated and consequent loss of product, the pH value of the slurry is preferably maintained between about 11 and about 13. Any residual sodium phenolate remaining in this sodium sulfite may be removed therefrom by washing with water and the wash water may be added to the filtrate. An amount of sodium sulfite substantially equivalent to the amount produced in the fusion plus the amount salted out by the phenolate and sodium hydroxide of the fusion mass remains undissolved and is recovered in the above operations; this sodium sulfite is comparatively pure and may be used as desired.

The solution of sodium phenolate obtained as above described may then be treated in order to recover phenol from the phenolate contained therein. If appreciable amounts of wash water from the washing of the sodium sulfite residue have been added to this solution, it may be desirable to evaporate water from the solution in order to maintain the amount of water recirculated in accordance with our invention substantially constant and, if necessary, to yield a substantially saturated sodium sulfite solution; evaporation of water at this point has the advantage of rendering inert or removing certain odoriferous components produced during the fusion operation. Any sodium sulfite that may crystallize during the evaporation step may be removed as desired. Phenol may then be liberated from the phenolate solution by bubbling sulfur dioxide therethrough until the solution is substantially neutral. We prefer to incorporate a substantial amount of air, e. g., about 30%, with the sulfur dioxide since we have found that the odor of the phenol obtained is improved thereby. The rate of sulfur dioxide feed should be adjusted so that reaction thereof with the phenolate to give phenol and sodium sulfite will take place readily; large excesses of sulfur dioxide should not be permitted to build up in the solution, since otherwise the sodium sulfite will tend to be converted to sodium bisulfite. The temperature at which this step is carried out should preferably be above about 35° C. in order to avoid hydration of the sodium sulfite; we have found that it is usually most desirable to carry out this step at temperatures approximating the boiling point of the solution. Atmospheric, sub-atmospheric or superatmospheric pressures may be employed, as desired. Because of the tendency of sodium phenolate to dissolve in wet phenol, the solution being treated should be well agitated at all times to insure adequate contact of the phenolate with the sulfur dioxide.

When substantially all the phenol has been liberated from the sodium phenolate, the mixture may be permitted to settle and the phenol which separates therefrom recovered and purified as desired. The aqueous solution from which the phenol is separated is substantially saturated with sodium sulfite, and thus may be re-used directly in the separation step hereinabove described; any sodium sulfite separating from the solution may be removed by filtration or may be re-dissolved by bubbling additional sulfur dioxide into the solution, thus converting the sulfite into the more soluble bisulfite. Since the solution is also saturated with respect to phenol, its re-use in accordance with our invention prevents loss of phenol in the subsequent liberation steps, as hereinabove set forth.

While the above description describes a series of related batch operations, it is to be understood that our invention is such that it may be readily adapted to continuous operation; thus the fusion mass in molten condition and the saturated sodium sulfite solution may be run in continuous streams into a tank in which they are agitated, the slurry formed continuously withdrawn and centrifuged, sulfur dioxide continuously introduced into the phenolate solution obtained from the centrifuge, phenol continuously recovered and the aqueous saturated sodium sulfite solution produced continuously returned for the treatment of the fusion mass. This method of operation has been found particularly advantageous in large-scale operations.

It is to be understood that while the above detailed description of our invention deals with the manufacture of phenol, the improvements of our invention may also be utilized in the manufacture of other aromatic hydroxy compounds such as cresols, resorcinol, naphthols, etc.; the term "aromatic hydroxy compound" is used throughout the specification and claims to include aromatic compounds substituted in the nucleus by one or more hydroxy groups. While particular reference is made to the use of sodium compounds, it is to be understood that the corresponding potassium or other alkali metal compounds could be used throughout the process; thus in the manufacture of resorcinol, the benzene disulfonic acid is preferably fused with potassium hydroxide. The temperature in one or all of the above steps may be below about 35° C., but in such cases additional water is preferably incorporated in the mass to insure the desired degree of fluidity.

The following example is illustrative of our invention. Amounts are given in parts by weight.

100 parts of a mixture comprising essentially sodium sulfite and sodium phenolate, produced by fusion of sodium benzene sulfonate with sodium hydroxide, were thoroughly agitated at a temperature of about 80° C. with about 200 parts of a saturated sodium sulfite solution. After about one hour of agitation the sodium sulfite remaining undissolved was filtered from the solution at a temperature above about 35° C., washed with a small amount of water and the wash water added to the filtrate. The filtrate was then concentrated to a slight extent, the sodium sulfite which crystallized was removed, and sulfur dioxide containing about 30% air was blown slowly through the solution for about 8 hours, the temperature of the solution being maintained at about 70° C.; during this time the solution was strongly agitated. While maintaining the temperature above about 35° C., the mass was permitted to settle and the phenol separated by decantation. The aqueous solution remaining was then used to treat another batch of fusion mass as hereinabove described.

From the above description it will be evident that our invention permits the recovery of sodium sulfite produced in the synthetic phenol process without the necessity of evaporating large quantities of water in order to obtain the salt. Furthermore, our invention provides a highly economical and well integrated process for the recovery of phenol from the fusion mass of sodium phenolate and sodium sulfite. Hence, our invention will undoubtedly be of great interest to those engaged in the manufacture of synthetic phenol.

Since certain changes may be made in carrying out the above process without departing from the scope of the invention, it is intended that all matter contained in the above description shall be interpreted as illustrative and not in a limiting sense.

We claim:

1. In a process for the manufacture of synthetic phenol involving sulfonation of benzene, conversion of the benzene sulfonic acid to sodium benzene sulfonate, fusion of the sulfonate with sodium hydroxide, separation of the sodium phenolate thus formed from the fusion mass and recovery of phenol therefrom, the improvements which comprise contacting the fusion mass with a substantially saturated sodium sulfite solution obtained from a previous operation, separating the aqueous solution thus formed containing the phenolate from the undissolved sodium sulfite, contacting said solution with sulfur dioxide to liberate phenol, separating the phenol from the aqueous solution, and recycling said solution for treating additional quantities of fusion mass, said operations being conducted at a temperature above the transition temperature of anhydrous sodium sulfite to sodium sulfite heptahydrate.

2. In a process for the manufacture of synthetic phenol involving sulfonation of benzene, conversion of the benzene sulfonic acid to sodium benzene sulfonate, fusion of the sulfonate with sodium hydroxide, separation of the sodium phenolate thus formed from the fusion mass and recovery of phenol therefrom, the improvements which comprise agitating the fusion mass with a substantially saturated sodium sulfite solution obtained from a previous operation in an amount equivalent to at least 1½ times the amount of said fusion mass, separating the aqueous solution thus formed containing the phenolate from the undissolved sodium sulfite while maintaining the pH value of the solution between about 11 and about 13, washing said undissolved sulfite with water and adding the wash water to the sodium phenolate solution, slightly concentrating said solution by evaporation, blowing a mixture of sulfur dioxide and air through said solution with agitation until the phenol is liberated from the phenolate, separating the phenol from the aqueous solution, and recycling said solution for treating additional quantities of fusion mass, said operations being conducted at temperatures above the transition temperature of anhydrous sodium sulfite to sodium sulfite heptahydrate.

3. In a process for the manufacture of an aromatic hydroxy compound from the corresponding aromatic sulfonic acid involving conversion of the sulfonic acid to an alkali metal sulfonate, fusion of the alkali sulfonate with the hydroxide of said alkali metal, separation of the alkali metal salt of the aromatic hydroxy compound thus formed from the fusion mass, and recovery of the aromatic hydroxy compound therefrom, the improvements which comprise contacting the fusion mass with a substantially saturated solution of the sulfite of the alkali metal obtained from a previous operation, separating the aqueous solution thus formed containing the alkali metal salt of the aromatic hydroxy compound from the undissolved alkali metal sulfite, contacting said solution with sulfur dioxide to liberate the aromatic hydroxy compound, separating said aromatic hydroxy compound from the aqueous solution, and recycling said solution for treating additional quantities of fusion mass.

4. In a process for the manufacture of synthetic phenol involving sulfonation of benzene, conversion of the benzene sulfonic acid to sodium benzene sulfonate, fusion of the sulfonate with sodium hydroxide, separation of the sodium phenolate thus formed from the fusion mass and recovery of phenol therefrom, the improvements which comprise contacting the fusion mass with a substantially saturated sodium sulfite solution obtained from a previous operation, separating the aqueous solution thus formed containing the phenolate from the undissolved sodium sulfite, contacting said solution with sulfur dioxide to liberate phenol, separating the phenol from the aqueous solution, and recycling said solution for treating additional quantities of fusion mass.

JOHN M. HARRIS, JR.
NORMAN W. WROBY.
WILLIAM B. BROWN.